United States Patent [19]
Hata et al.

[11] Patent Number: 5,479,402
[45] Date of Patent: Dec. 26, 1995

[54] LOGICAL CHANNEL SETTING SYSTEM FOR ATM NETWORK

[75] Inventors: Emi Hata; Ryoichi Ishibashi; Tetsuo Tachibana; Toshio Irie, all of Kawasaki, Japan

[73] Assignee: Fujitsu Limited, Kawasaki, Japan

[21] Appl. No.: 272,302

[22] Filed: Jul. 8, 1994

Related U.S. Application Data

[63] Continuation of Ser. No. 846,070, Mar. 5, 1992, abandoned.

[30] Foreign Application Priority Data

Mar. 5, 1991 [JP] Japan ................................... 3-037660

[51] Int. Cl.$^6$ ................................................. H04L 12/50
[52] U.S. Cl. ........................... 370/60.1; 370/84; 370/94.1; 370/110.1
[58] Field of Search .................... 370/58.1, 58.2, 370/60, 60.1, 79, 84, 85.7, 95.1, 110.1; 379/251, 258, 268

[56] References Cited

U.S. PATENT DOCUMENTS

| | | | |
|---|---|---|---|
| 5,164,937 | 11/1992 | Tanabe et al. | 370/94.1 |
| 5,164,938 | 11/1992 | Jurkevich et al. | 370/95.1 |
| 5,199,027 | 3/1993 | Barri | 370/60.1 |

OTHER PUBLICATIONS

"High-Performance Parallel Interface", Mechanical, Electrical and Signalling Protocol Specification (HPPI-PH), Preliminary Draft Proposed American National Standard for Information Systems, Dec. 11, 1989.

"Extending HIPPI at 800 Mega Bits Per Second Over Serial Links Using HOT ROD Technology", K. Annamalai, *Proceedings International Society for Optical Engineering*, pp. 178–189, vol. 1364, Sep. 19, 1990.

"Fiber Channel—The Next Standard Peripheral Interface and More", R. Cummings, *Proceedings International Society for Optical Engineering*, pp. 170–177, vol. 1364, Sep. 19, 1990.

"Variable Bit Rate HDTV Communication in ATM Networks", Takase et al., *Globecom*, pp. 1052–1056, vol. 2, Dec. 2, 1990.

"Transport of Gigabit/Sec Data Packets Over SONET/ATM Networks", M. Arnould et al., *Globecom*, pp. 968–975, Dec. 2, 1991.

Primary Examiner—Benedict V. Safourek
Attorney, Agent, or Firm—Staas & Halsey

[57] ABSTRACT

A logical channel setting system is applied to an asynchronous transfer mode (ATM) network which is coupled to terminal equipments which are in conformance with a high performance parallel interface (HIPPI) via respective terminal adapters which are in conformance with the HIPPI. The logical channel setting system includes a call part, provided in a transmitting terminal adapter, for setting a logical channel in the ATM network in response to a request signal which is ON and is received from a transmitting terminal equipment which is coupled to the transmitting terminal adapter, and a disconnect part, provided in the transmitting terminal adapter, for releasing the logical channel which is previously set in the ATM network in response to a request signal which is OFF and is received from the transmitting terminal equipment which is coupled to the transmitting terminal adapter.

36 Claims, 9 Drawing Sheets

LOGICAL CHANNEL SETTING SYSTEM FOR ATM NETWORK

This application is a continuation of U.S. application No. 07/846,070, filed Mar. 5, 1992, now abandoned.

BACKGROUND OF THE INVENTION

The present invention generally relates to logical channel setting systems, and more particularly to a logical channel setting system for an asynchronous transfer mode (ATM) network.

Recently, there is active research to realize a broadband integrated services digital network (B-ISDN) using the ATM. On the other hand, a high performance parallel interface (HIPPI) has been proposed to transfer a large amount of data at a high speed between computers such as supercomputers or between a terminal and a computer. A method has also been proposed to convert HIPPI data into ATM cells at a terminal adapter (TA) on the transmitting side, to switch and transmit the ATM cells within an ATM network, and to convert the ATM cells back into the HIPPI data at a TA on the receiving side. However, in order to transmit the HIPPI data via the ATM network, it is necessary to reserve a band in which the large amount of data can be transmitted, as a virtual channel (VC, or logical channel), and the network and the like are greatly affected thereby.

Figure 1:
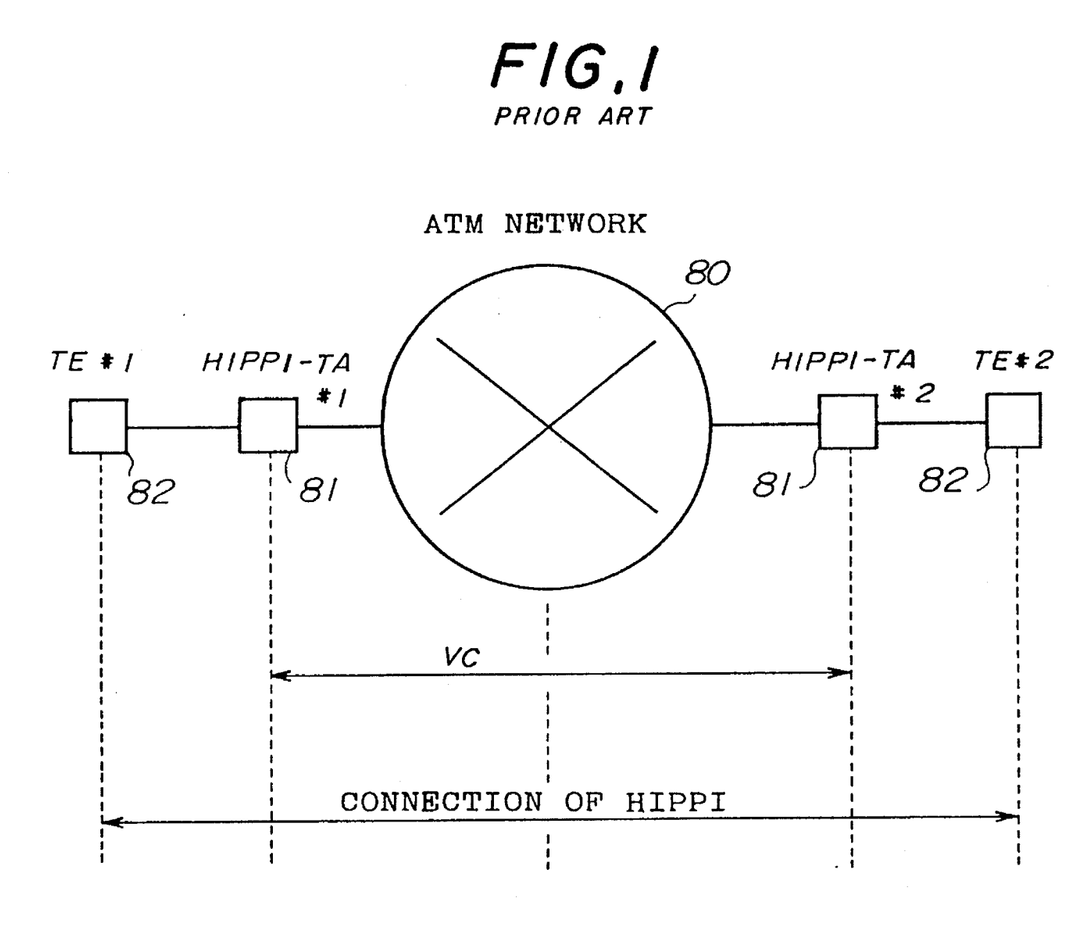
FIG. 1 is a system block diagram showing a communication system having a HIPPI interface provided by an ATM network.

FIG. 1 shows a communication system using a HIPPI interface provided by an ATM network. In FIG. 1, an ATM network 80 which is a B-ISDN is coupled to a plurality of terminal adapters (HIPPI-TA) 81 of the HIPPI interface. A HIPPI terminal equipment (TE) is coupled to each HIPPI-TA 81. In addition, the ATM network 80 is coupled to one or a plurality of terminal adapters (not shown) of other interfaces.

Figure 2:
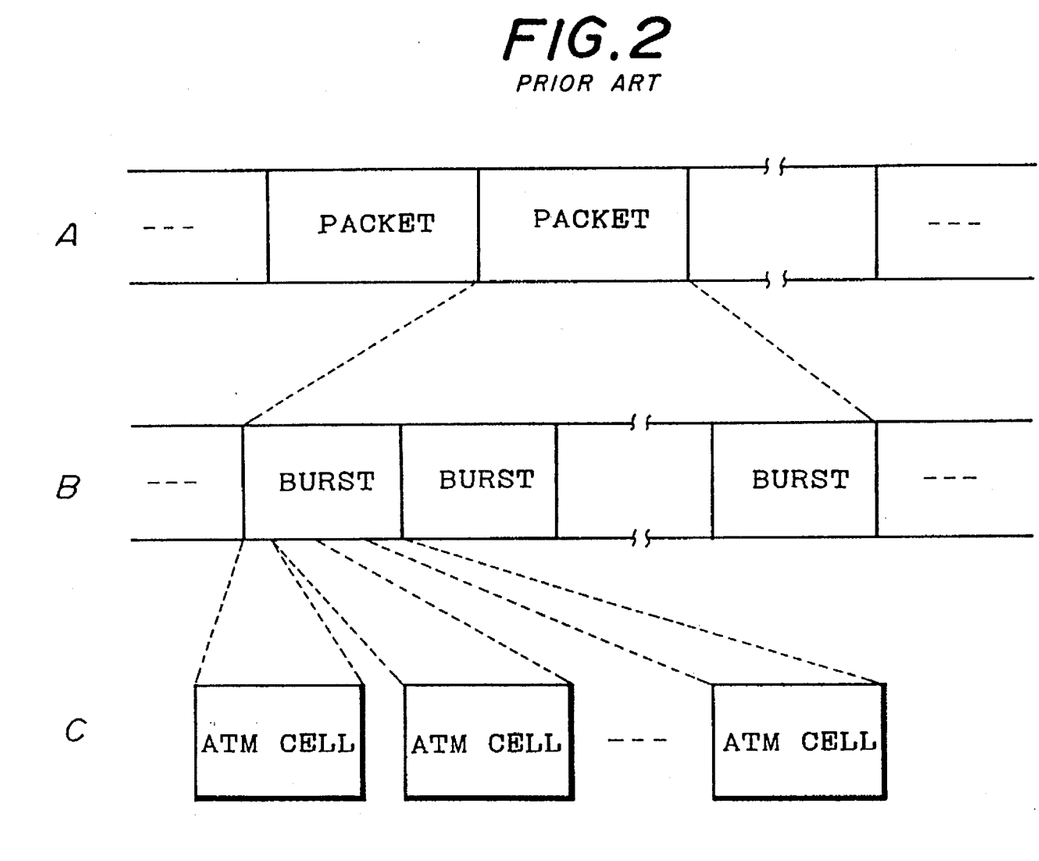
FIG. 2 shows the frame structure of the HIPPI protocol.

FIG. 2 shows the frame structure of the HIPPI protocol. As shown in line A of FIG. 2, a group of data received from a host unit, such as a computer and a TE, is called a packet, and a maximum length of this packet is 4 Gbytes. In the TE 82 of the HIPPI interface, the packet is divided into units called bursts, as shown in line B of FIG. 2, and each burst has a fixed length of 1 kbytes. The packet is transferred between the TE 82 and the HIPPI-TA 81 via parallel buses made up of a data bus, a control bus, an address bus and the like. The HIPPI-TA 81 converts the bursts into the ATM protocol. According to the ATM protocol, ATM cells having a total length of 53 octets (bytes) are generated as shown in line C of FIG. 2. Out of the 53 octets, the first 5 octets form a header and the remaining 48 octets form an information part, and the burst data are successively transmitted in division in this information part.

Figure 3:
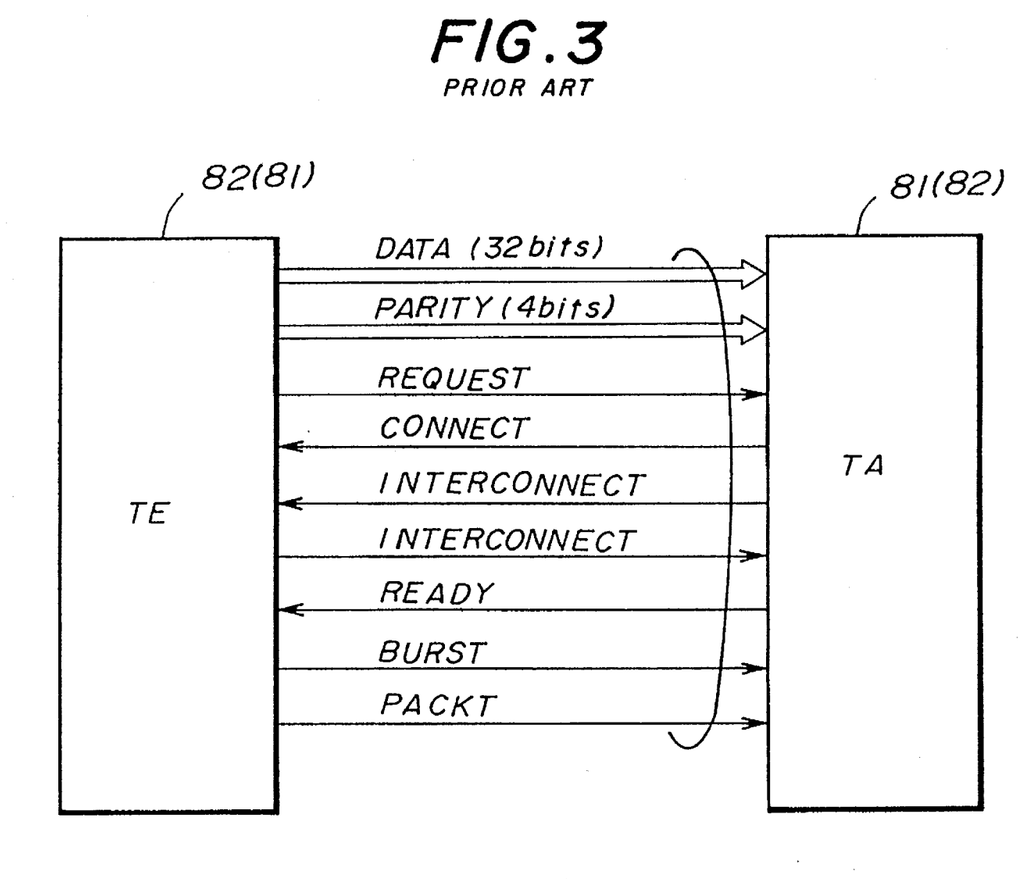
FIG. 3 is a block diagram for explaining the HIPPI interface.

FIG. 3 is a diagram for explaining the HIPPI interface. As shown in FIG. 3, when making a data transfer in one direction between a HIPPI terminal (or computer) "TE" and a TA, various kinds of control signals are exchanged. Although the HIPPI interface is used for making data communication in one direction, the control signals are exchanged, that is, the control signals are transmitted in both directions. The principal signals exchanged between the transmitting side HIPPI TE 82 and a transmitting side HIPPI-TA 81 (or between a receiving side HIPPI-TA 81 and a receiving side HIPPI TE 82) include a 32-bit parallel data signal, a 4-bit parity signal with respect to the data, a request signal, a connect signal, a ready signal, a burst signal, a packet signal and the like. The request signal is ON when requesting a data transmission and becomes OFF when the data transmission ends. The connect signal indicates a state where the power source is turned ON, and the ready signal indicates that a necessary preparations are completed and the system is ready for a data transmission. The burst signal indicates the breakpoint of the burst information, and the packet signal indicates the breakpoint of the packet.

Because the HIPPI interface shown in FIG. 3 is provided between each HIPPI TE 82 and the corresponding HIPPI-TA 81, it is necessary to convert the HIPPI protocol into the ATM network protocol at the transmitting (or receiving) side HIPPI-TA 81 for transmission within the ATM network 80 and to reproduce the HIPPI protocol at the receiving (or transmitting) side HIPPI-TA 81.

Conventionally, in order to transmit normal data, a VC (FIG. 1) is set between the HIPPI-TA 81 (#1) and the other HIPPI-TA 81 (#2) at the time when a call setup request is made by the man-machine- interface (MMI) of the HIPPI-TA 81 (#1). In addition, this VC is released at the time when the disconnect request is made by the MMI of the HIPPI-TA 81 (#1).

In order to enable data transmission at the HIPPI interface, a procedure is carried out in which a request signal, which is ON, is transmitted from the transmitting side HIPPI TE 82 and a connect signal, which is ON, is returned from the receiving side HIPPI TE 82. In addition, when ending the data transmission, a procedure is carried out in which a request signal, which is OFF, is transmitted from the transmitting side HIPPI TE 82 and a connect signal, which is OFF, is returned from the receiving side HIPPI TE 82. As shown in FIG. 1, the connection of the two HIPPI TEs 82 (#1 and #2) is formed via the HIPPI-TAs 81 and the ATM network 80 in the state in which the VC is set. As described above, the VC is conventionally set at the time when the call setup request is made by the MMI of the HIPPI-TA 81, and the VC is released at the time when the disconnect request is made by the MMI of the HIPPI-TA 81.

As another example of the conventional system, there is also a system which sets the VC at a reserved time. According to such HIPPI interfaces, a broad band of 600 Mbps, for example, is declared and set to the ATM network 80 as the band which will be used when setting the VC with respect to the ATM network 80. However, after the HIPPI-TA 81 makes the call setup, responsive to the request by the MMI, there is a problem in that the VC is constantly maintained even when no data is actually transmitted from the HIPPI TE 82.

In this case, the ATM network 80 must allocate the broad band of the transmission line for the VC which is not used, and a transmission request from other HIPPI TEs 82 may not be accepted because there may not be enough margin when the available band is calculated. On the other hand, in the case where the VC is set by time reservation, the VC having the broad band is set in waste if the time in which the data is actually transmitted occupies only a short time interval of the reserved time span.

SUMMARY OF THE INVENTION

Accordingly, it is a general object of the present invention to provide a novel and useful logical channel setting system in which the problems described above are eliminated.

Another and more specific object of the present invention is to provide a logical channel setting system for an asynchronous transfer mode (ATM) network which is coupled to terminal equipments, which are in conformance with a high performance parallel interface (HIPPI), via respective terminal adapters which likewise are in conformance with the HIPPI, wherein the logical channel setting system comprises call means, provided in a transmitting terminal adapter, for setting a logical channel in the ATM network in response to a request signal which is ON and which is received from a transmitting terminal equipment which is coupled to the transmitting terminal adapter, and disconnect means, provided in the transmitting terminal adapter, for releasing the logical channel which is previously set in the ATM network in response to a request signal which is OFF and is received from the transmitting terminal equipment which is coupled to the transmitting terminal adapter. According to the logical channel setting system of the present invention, it is possible to improve the utilization efficiency of the ATM network because the broad band will not be wasted when providing the HIPPI by the ATM network.

Still another object of the present invention is to provide a logical channel setting system for an asynchronous transfer mode (ATM) network which is coupled to terminal equipments which are in conformance with a high performance parallel interface (HIPPI) via respective terminal adapters which are in conformance with the high performance parallel interface (HIPPI), wherein the logical channel setting system comprises call means, provided in a transmitting terminal adapter, for setting a logical channel in the asynchronous transfer mode (ATM) network, and wherein the logical channel has a narrow band of a Kbps order, first message transmitting means, provided in the transmitting terminal adapter, for transmitting to the asynchronous transfer mode (ATM) network a band change message which requests a change of the band of the logical channel from the narrow band to a broad band of Mbps order in response to a request signal which is ON and is received from a transmitting terminal equipment, and second message transmitting means, provided in the transmitting terminal adapter, for transmitting to the asynchronous transfer mode (ATM) network a band release message which requests a change of the band of the logical channel from the broad band to the original narrow band in response to a request signal which is OFF and is received from the transmitting terminal equipment. According to the logical channel setting system of the present invention, the broad band is not fixedly used and the band can be changed depending on the request from the terminal equipment. For this reason, it is possible to effectively manage the band at the terminal equipment and/or the ATM network.

Other objects and further features of the present invention will be apparent from the following detailed description when read in conjunction with the accompanying drawings.

BRIEF DESCRIPTION OF THE DRAWINGS

FIG. 11 is a flow chart for explaining an operation of a terminal adapter of the first embodiment.

DESCRIPTION OF THE PREFERRED EMBODIMENTS

Figure 4:
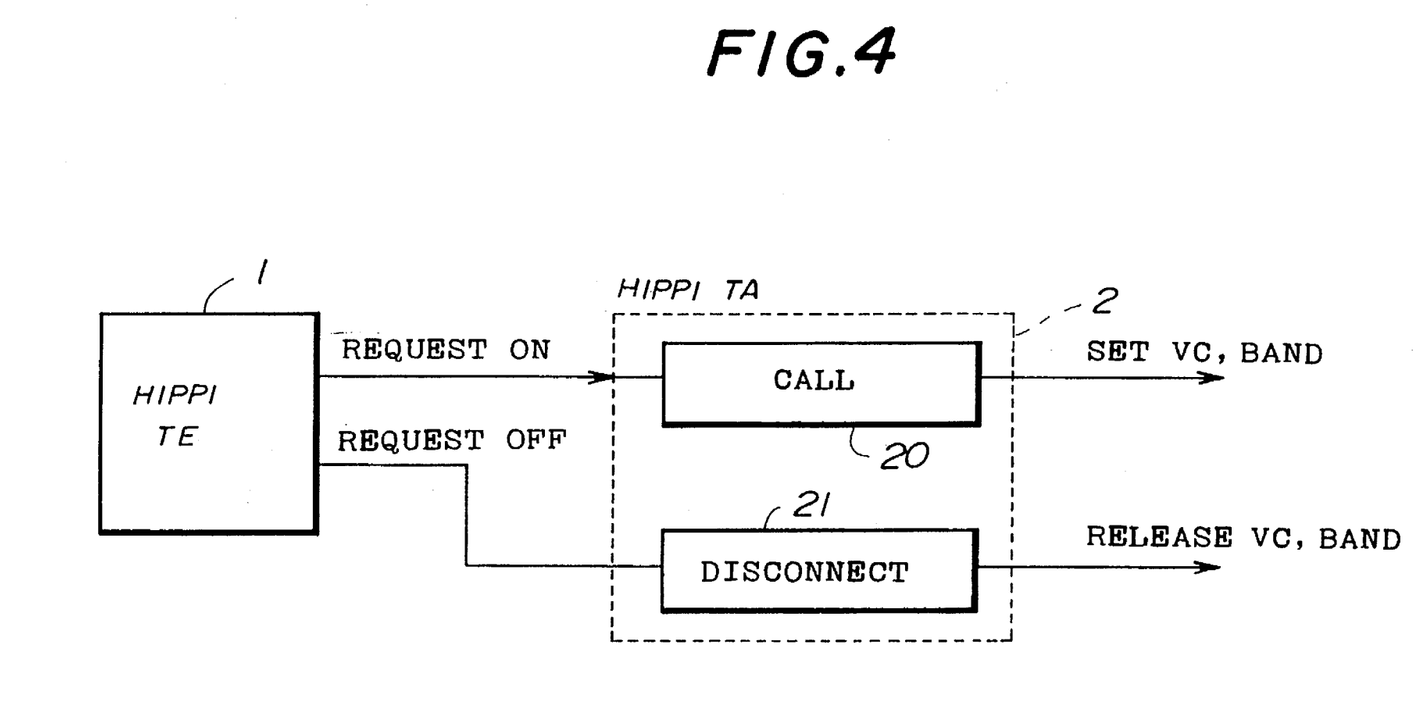
FIG. 4 is a system block diagram for explaining the operating principle of a first embodiment of a logical channel setting system according to the present invention.
Figure 5:
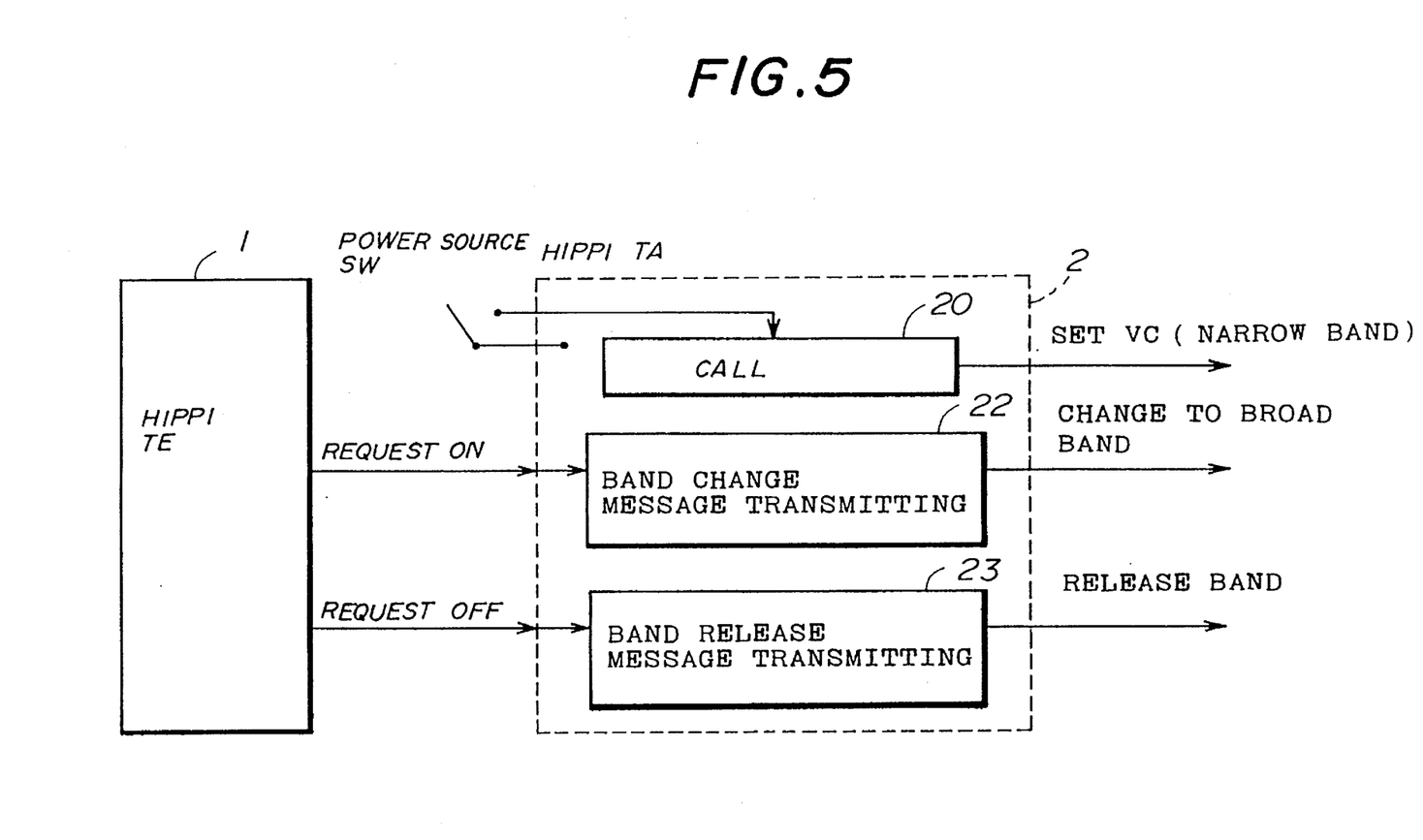
FIG. 5 is a system block diagram for explaining the operating principle of a second embodiment of the logical channel setting system according to the present invention.

First, a description will be given of the operating principles of first and second embodiments of a logical channel setting system according to the present invention, by referring to FIGS. 4 and 5. FIG. 4 shows an essential part of the first embodiment for explaining the operating principle thereof, and FIG. 5 shows an essential part of the second embodiment for explaining the operating principle thereof. In FIG. 5, those parts which are basically the same as those corresponding parts in FIG. 4 are designated by the same reference numerals, and a description thereof will be omitted.

In FIG. 4, a HIPPI TE 1 and a HIPPI TA 2 are coupled as shown, and the TA 2 includes a call unit 20 and a disconnect unit 21. The TA 2 on the transmitting side sets a VC (logical channel) by calling an ATM network (not shown) in response to a request signal which is ON and is received from the TE 1 on the transmitting side. The TA 2 on the transmitting side releases the VC in response to a request signal which is OFF and is received from the TE 1 on the transmitting side.

In the first embodiment, the TA 2 does not make a call in response to a call setup request by the MMI. When the TE 1 generates a control signal indicating the request signal which is ON, the call unit 20 of the TA 2 is started and sends call setup information with respect to the ATM network. A broadband VC of 600 Mbps, for example, which is specified in advance is included within the call setup information. The ATM network receives the call setup information and sets up a call, if the call can be accepted, to enable a communication. Thereafter, when the data transmission from the TE 1 ends, the request signal becomes OFF. The disconnect unit 21 of the TA 2 is started in response to this request signal which is OFF, and the disconnect means 21 sends a signal for releasing the set VC with respect to the ATM network.

In FIG. 5, a call is made to the ATM network and a VC of a narrow band is set when the power is turned ON at the TA 2. A message for changing the band to the broad band is sent when a request signal which is ON is received from the TE 1. On the other hand, a message for changing the band to the narrow band is sent when a request signal which is OFF is received from the TE 1.

In the second embodiment, the call unit 20 is started when the call setup request is generated by the MMI at the TA 2, and the call setup information is sent with respect to the ATM network, similarly to the first embodiment. But in this case, a narrow band of 64 Kbps, for example, is set in advance for the band of the VC. The ATM network receives the call setup information and sets up a call, if the call can be accepted, to enable a communication. Thereafter, if a data transmission is to be made from the TE 1, the request signal is turned ON. When the TA 2 detects the ON state of the request signal, a band change message transmitting unit 22 is started. The band change message transmitting unit 22 transmits the band change message which requests the change of the band of the VC, previously set at the narrow band, to the broad band. When the ATM network receives this message, it becomes possible to transmit the data from the TE 1 using the broad band.

When the data transmission ends, the TE 1 turns the request signal OFF. When the TA 2 detects the OFF state of the request signal, a band release message transmitting unit 23 is started. This band release message transmitting unit 23 transmits a message which has a content opposite to that of the message transmitted from the band change message transmitting unit 22. In other words, the band release message transmitting unit 23 transmits the above described message which requests the change of the band of the VC, previously set at the broad band, to the narrow band. As a result, a large part of the broad band is released, and only a part of the broad band remains.

Figure 6:
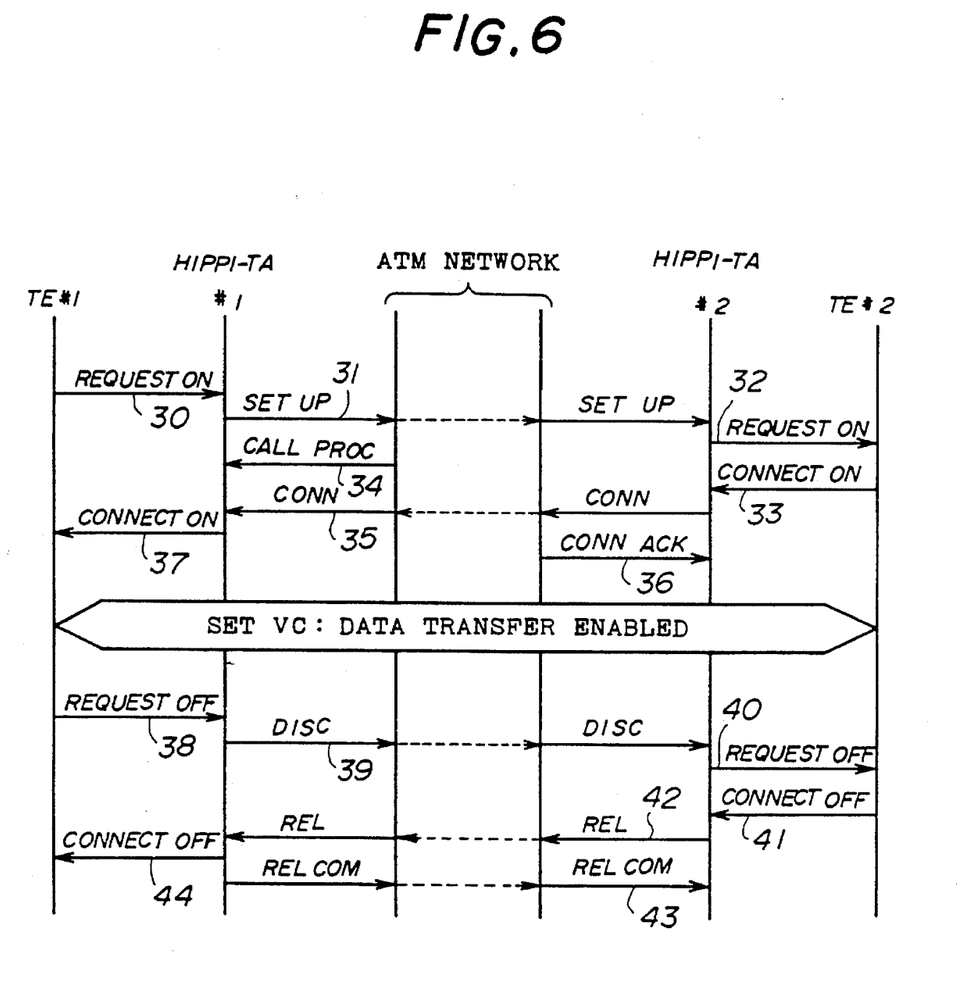
FIG. 6 shows a control sequence used in the first embodiment.
Figure 7:
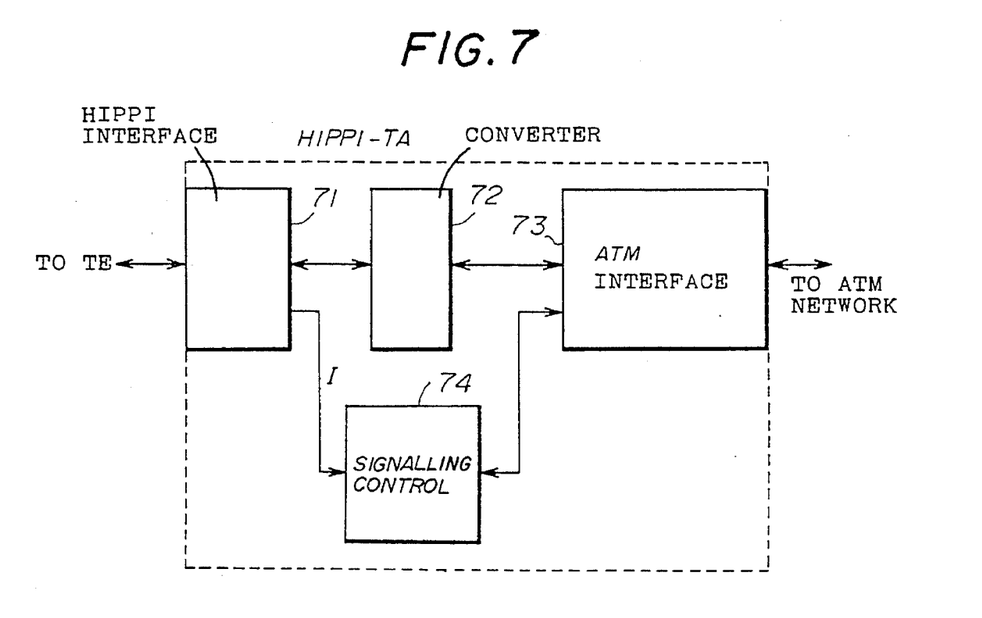
FIG. 7 is a system block diagram showing an embodiment of a HIPPI-TE used in the first embodiment.

Next, a more detailed description will be given of the first embodiment, by referring to FIGS. 6 and 7. FIG. 6 shows a control sequence of the first embodiment, and FIG. 7 shows an embodiment of the TA which is used in the first embodiment. It will be assumed for the sake of convenience that this embodiment is applied to the system shown in FIG. 1.

The control sequence shown in FIG. 6 will be described with reference to the following three basic procedures.

According to a first procedure, the TE #1 transmits a request signal which is ON (REQUEST ON) to the TA #1 in a step 30. The TA #1 which receives the request signal which is ON (REQUEST ON) makes a call setup (SET UP) by requesting a VC and a broad band of 600 Mbps, for example, with respect to the TA #2 and the TE #2 via the ATM network 80 in a step 31. Then, a HIPPI interface is made between the TA #2 and the TE #2. In other words, the request signal which is ON (REQUEST ON) is transmitted from the TA #2 to the TE #2 in a step 32, and a connect signal which is ON (CONNECT ON) is returned from the TE #2 to the TA #2 in a step 33. Thereafter, a layer 3 (network layer) procedure is carried out between the ATM network 80 and the TAs #2 and #1. More particularly, a call procedure signal (CALL PROC) is transmitted from the ATM network 80 to the TA #1 in a step 34, a connect message (CONN) is transmitted from the TA #2 to the TA #1 via the ATM network 80 in a step 35, and a connection acknowledge message (CONN ACK) is transmitted from the ATM network 80 to the TA #2 in a step 36. The data transfer between the TEs #1 and TE #2 is enabled when the connect signal which is ON (CONNECT ON) is returned from the TA #1 to the TE #1 in a step 37.

According to a second procedure, a request signal which is OFF (REQUEST OFF) is transmitted from the TE #1 to the TA #1 in a step 38 when the data transfer ends. The TA #1 which receives this request signal which is OFF (REQUEST OFF) starts to transmit a disconnect message (DISC) to the TA #2 and the TE #2 via the ATM network 80 in a step 39. The TA #2 transmits the request signal which is OFF (REQUEST OFF) to the TE #2 in a step 40 in response to the disconnect message (DISC). The TE #2 transmits a connect signal which is OFF (CONNECT OFF) to the TA #2 in a step 41, and the TA #2 transmits a release message (REL) to the TA #1 via the ATM network 80 in response to the connect signal which is OFF (CONNECT OFF). In addition, a release communication message (REL COM) is transmitted from the TA #1 to the TA #2 via the ATM network 80 in a step 43. The VC and the band is released by the layer 3 clearing procedure of the steps 42 and 43, and the TA #2 transmits the connect signal which is OFF (CONNECT OFF) to the TE #1 in a step 44.

According to a third procedure, the above described first and second procedures are repeated when the data transfer is to be made again, and a request signal which is ON is transmitted from the transmitting TE.

FIG. 11 is a flow chart showing the operation of the HIPPI-TA of the first embodiment, and more particularly, the operation of the signaling control part 74.

In FIG. 11, a step S1 decides whether the received message is a request signal which is ON or a call setup signal. If the request signal which is ON is received from the TE in the step S1, a step S2 sends the call setup signal to the ATM network, and a step S3 decides whether or not a message is input, that is, whether or not a call procedure signal is received from the ATM network. If the decision result in the step S3 is YES, a step S4 sends a connect message to the TE, and a communication or a data transfer is enabled in a step S5.

On the other hand, if the call setup signal is received from the ATM network in the step S1, a step S6 sends the request signal which is ON to the TE, and a step S7 decides whether or not a message is input, that is, whether or not a connect signal which is ON is received from the TE. If the decision result in the step S7 is YES, a step S8 sends a connect message to the ATM network. A step S9 decides whether or not a connection acknowledge message is received from the ATM network, and the process advances to the step S5 if the decision result in the step S9 is YES.

On the other hand, if the decision result in the step S7 or S9 is NO, a step S10 carries out a disconnect process and the process ends.

After the step S5, a step S11 decides whether a request signal which is OFF or a disconnect message is received. If the request signal which is OFF is received from the TE in the step S11, a step S12 decides whether or not a message is input, that is, whether or not a release message is received from the ATM network. If the decision result in the step S12 is YES, a step S13 sends a connect signal which is OFF to the TE, a step S14 sends a release communication message to the ATM network, and the process ends.

On the other hand, if the disconnect message is received from the ATM network in the step S11, a step S15 sends a request signal which is OFF to the TE. A step S16 decides whether or not a message is input, that is, whether or not a connect signal which is OFF is received from the TE. If the decision result in the step S16 is YES, a step S17 sends a release message to the ATM network. A step S18 decides whether or not a message is input, that is, whether or not a release communication message is received from the ATM network, and the process ends if the decision result in the step S18 is YES.

If the decision result in any of the steps S3, S12, S16 and S18 is NO, the process advances to the step S10 described above, and the process ends after the step S10.

In this first embodiment, the TAs #1 and #2 respectively have the construction shown in FIG. 7. The TA shown in FIG. 7 includes a HIPPI interface part 71, a converter part 72, an ATM interface part 73 and a signaling control part 74 which are connected as shown. When the HIPPI interface part 71 detects a request signal which is ON from the TE, the HIPPI interface part 71 supplies an information field I which is received via the data line to the signaling control part 74. The information field I includes the destination address, the VC (logical channel) and the like, and the signaling control part 74 makes a call setup operation using the destination address. In other words, the signaling control part 74 generates a call setup message which includes the destination address, the VC (logical channel) and the band, and transmits the call setup message to the ATM network via the ATM interface part 73. When a connect signal is returned from the ATM network, the converter part 72 converts the connect signal into a signal of the HIPPI interface and turns ON the connect signal of the HIPPI interface part 71.

Figure 8:
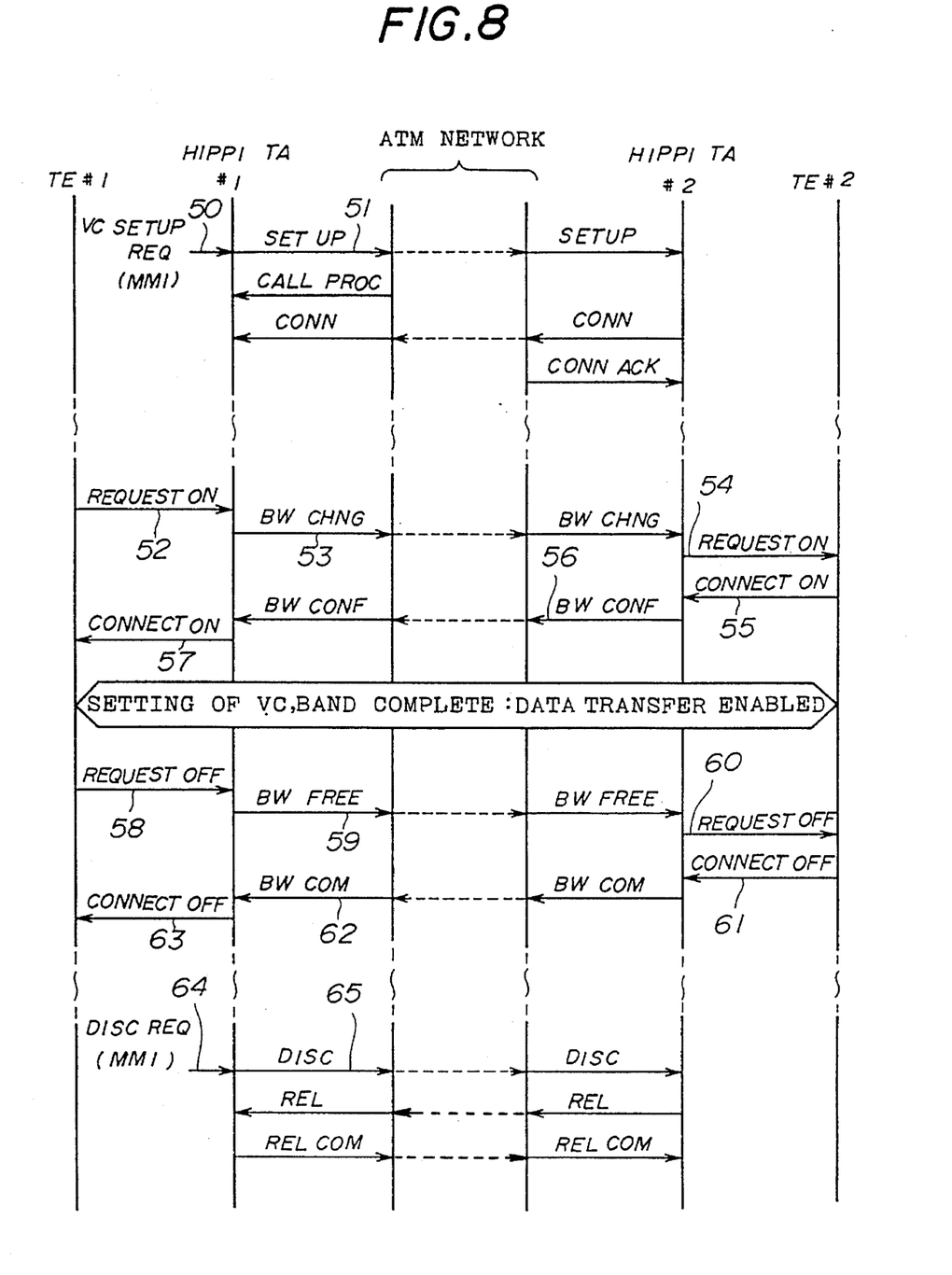
FIG. 8 shows a control sequence used in the second embodiment.
Figure 9A:
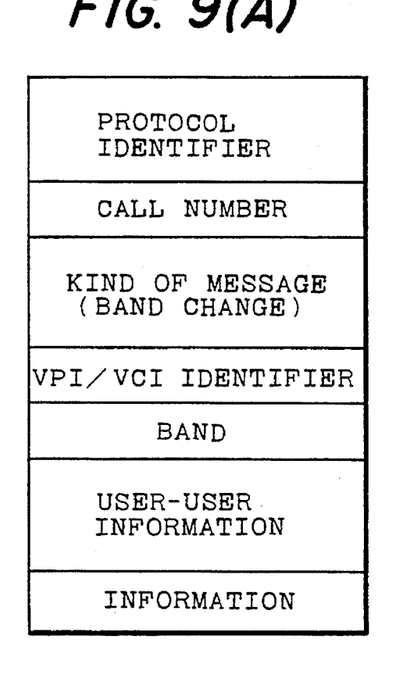
FIGS. 9(A) to 9(C) show embodiments of messages used in the second embodiment.
Figure 9B:
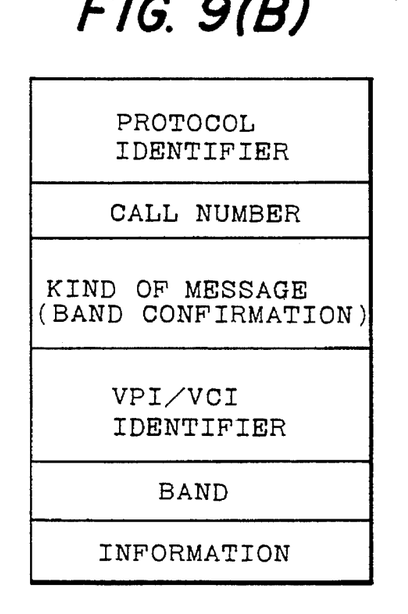

Next, a more detailed description will be given of the second embodiment, by referring to FIGS. 8 through 10. FIG. 8 shows a control sequence of the second embodiment, FIG. 9 shows embodiments of message formats employed in the second embodiment, and FIG. 10 shows an embodiment of the TA which is used in the second embodiment. It will be assumed for the sake of convenience that this embodiment is applied to the system shown in FIG. 1.

The control sequence shown in FIG. 8 will be described with reference to the following five basic procedures.

According to a first procedure, the MMI of the TA #1 makes a call setup request (VC SETUP REQ) in a step 50, and the TA #1 makes a call setup (SET UP) with respect to the TA #2 via the ATM network 80 in a step 51. In this case, the band of the requested VC is a narrow band. Similarly as in the case of the first embodiment described above, the ATM network 80 carries out the layer 3 procedure, and the VC is set between the TAs #1 and #2, thereby enabling the communication.

According to a second procedure, the TE #1 which is to make the communication transmits a request signal which is ON (REQUEST ON) to the TA #1 in a step 52. The TA #1 which receives the request signal which is ON (REQUEST ON) transmits a band change message (BW CHNG) which indicates the broad band to the TA #2 via the ATM network 80 in a step 53. The ATM network 80 switches the band to the broad band requested by the TE #1 in response to the band change message (BW CHNG). On the other hand, the TA #2 transmits the request signal which is ON (REQUEST ON) to the TE #2 in a step 54, and the TE #2 returns a connect signal which is ON (CONNECT ON) to the TA #2 in a step 55. The TA #2 returns a band confirmation message (BW CONF) to the TA #1 via the ATM network 80 in a step 56 in response to the connect signal which is ON (CONNECT ON). In addition, the TA #1 transmits the connect signal which is ON (CONNECT ON) to the TE #1 in a step 57, thereby enabling a data transfer.

According to a third procedure, the TE #1 transmits a request signal which is OFF (REQUEST OFF) to the TA #1 in a step 58 when the data transfer ends. The TA #1 transmits to the TA #2 via the ATM network 80 a band release message (BW FREE) for changing the band from the broad band to the narrow band in a step 59. The TA #2 generates the request signal which is OFF (REQUEST OFF) in a step 60 in response to the band release message (BW FREE), and the TE #2 transmits a connect signal which is OFF (CONNECT OFF) to the TA #2 in a step 61 in response to the request signal which is OFF (REQUEST OFF). The TA #2 transmits a band change confirmation message (BW COM) to the TA #1 via the ATM network 80 in a step 62 in response to the connect signal which is OFF (CONNECT OFF). The TA #1 transmits the connect signal which is OFF (CONNECT OFF) to the TE #1 in a step 63 in response to the band change confirmation message (BW COM).

According to a fourth procedure, the second and third procedures described above are repeated if a data transfer is to be made again.

According to a fifth procedure, the MMI of the TA #1 makes a disconnect request (DISC REQ) in a step 64 if all data transfer is to end. As a result, a disconnect message (DISC) is transmitted from the TA #1 to the TA #2 via the ATM network 80 in a step 65, and the VC is released similarly as described above.

The second embodiment newly uses messages related to the band change. FIG. 9(A) to 9(B) show embodiments of message formats which may be employed in this second embodiment. In FIG. 9(A) shows a band change message used in the step 53, FIG. 9(B) shows a band confirmation message used in the step 56, and FIG. 9(C) shows a band release message or a no-good message which is used in a case where the requested setting is not accepted by the ATM network.

In FIG. 9(A), the band change message includes a protocol identifier, a call number, a kind of message, VPI/VCI identifier, a band, a user-user information part, and an information part, where VPI denotes the virtual (logical) path identifier and VCI indicates the virtual (logical) channel identifier. The kind of message relates to the information indicating the band change message.

In FIG. 9(B), the band confirmation message includes a protocol identifier, a call number, a kind of message, VPI/VCI identifier, a band, and an information part. The kind of message in this case relates to the information indicating the band change confirmation.

Figure 9C:
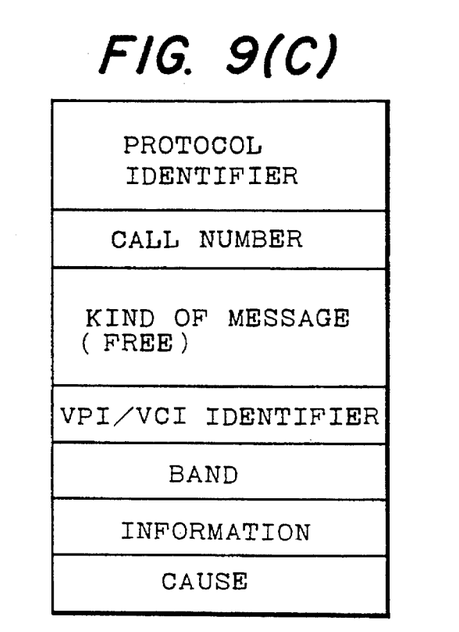
Figure 10:
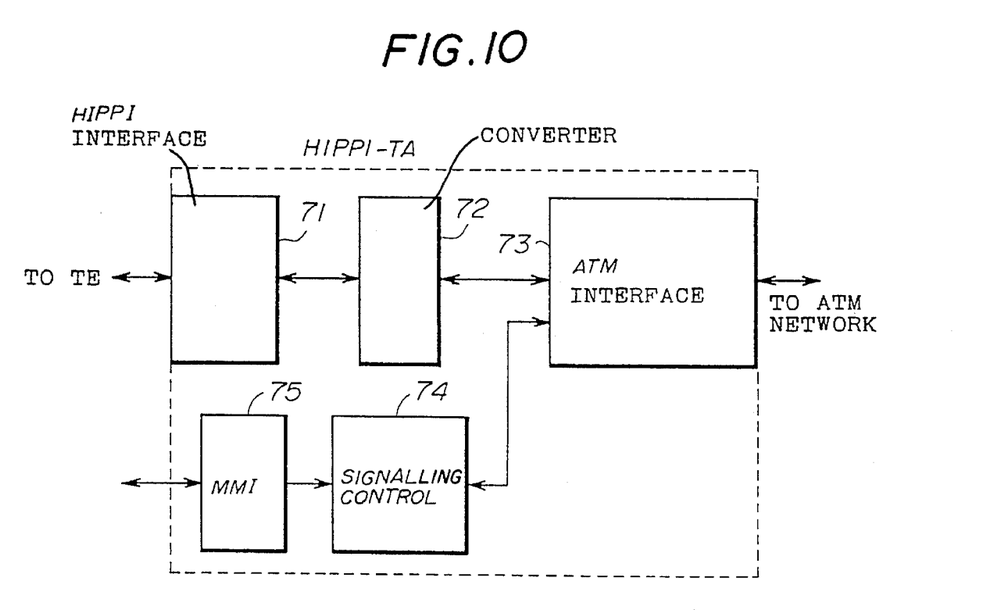
FIG. 10 is a system block diagram showing an embodiment of a HIPPI-TE used in the second embodiment.

In FIG. 9(C), the band release message includes a protocol identifier, a call number, a kind of message, VPI/VCI identifier, a band, an information part, and a cause for indicating the reason of the non-acceptance.

In this second embodiment, the TAs #1 and #2 respectively have the construction shown in FIG. 10. The TA shown in FIG. 10 includes a HIPPI interface part 71, a converter part 72, an ATM interface part 73, a signaling control part 74 and a man-machine-interface (MMI) 75 which are connected as shown. An input/output equipment (not shown) is externally coupled to the MMI 75 to input/output the information necessary for carrying out a direct call setup from the TA.

When a call setup request is made by the MMI of the TA shown in FIG. 10, the signaling control part 74 is driven via the MMI 75. The signaling control part 74 generates a call setup message for making a call from information such as the VC, the band (narrow band) and the destination address using information input from the MMI 75 or information prestored in the signaling control part 74. This call setup message is transmitted via the ATM interface part 73.

When the VC is set, the HIPPI interface part 71 detects a request signal which is ON and is thereafter received from the TE. Then, the converter part 72 generates the band change message having the format shown in (A) of FIG. 9, and transmits this band change message from the ATM interface part 73 to the ATM network. When the band change confirmation message having the format shown in (B) of FIG. 9 is returned from the ATM network in response to the band change message, the ATM interface part 73 receives and outputs the band change confirmation message to the converter part 72. The converter part 72 outputs a connect signal which is ON in response to the band change confirmation message and drives the HIPPI interface part 71 thereby.

Thereafter, a communication is made via the TA shown in FIG. 10, and a request signal which is OFF is received from the TE when the communication ends. The converter part 72 outputs a connect signal which is OFF via the HIPPI interface part 71 when the band release message is generated by the converter part 72 and is transmitted via the ATM interface part 73 and the release confirmation message which notifies the release of the broad band (i.e., the narrow band remains) is received from the ATM network. In addition, when the power of the TA shown in FIG. 10 is turned OFF, a disconnect message is transmitted from the signaling control part 74 and the VC is disconnected in the ATM network.

Further, the present invention is not limited to these embodiments, but various variations and modifications may be made without departing from the scope of the present invention.

What is claimed is:

1. A logical channel setting system for an asynchronous transfer mode (ATM) network the system comprising:

a terminal adapter and corresponding terminal equipment, each operable in conformance with a high performance parallel interface (HIPPI) and the terminal adapter and the terminal equipment being selectively operable respectively as a transmitting terminal adapter and a corresponding transmitting terminal equipment and, respectively, as a receiving terminal adapter and a corresponding receiving terminal equipment, the terminal equipment being coupled by the corresponding terminal adapter to the ATM network;

the transmitting terminal equipment being selectively operable for generating and supplying, to the corresponding transmitting terminal adapter, a request signal which, when ON, requests the setting of an associated logical channel in the ATM network and which, when OFF, requests the release of an associated logical channel which currently is set in the ATM network; and the terminal adapter further comprises:

call means, operable when the terminal adapter is a transmitting terminal adapter and responsive to the receipt of an ON request signal from the corresponding transmitting terminal equipment, for setting the associated logical channel in the ATM network between the transmitting terminal adapter and the receiving terminal adapter of a corresponding receiving terminal equipment, thereby to enable the transfer of data from the transmitting terminal equipment and corresponding transmitting terminal adapter through the ATM network to the receiving terminal adapter and thereby to the corresponding receiving terminal equipment, and disconnect means, operable when the terminal adapter is a transmitting terminal adapter, for releasing a logical channel, which currently is set in the ATM network, in response to an OFF request signal received from the corresponding transmitting terminal equipment.

2. The logical channel setting system as claimed in claim 1, wherein said call means sets the logical channel by transmitting a call setup message to the ATM network requesting the logical channel and a band to the receiving terminal adapter and corresponding receiving terminal equipment via the ATM network.

3. The logical channel setting system as claimed in claim 2, wherein said call means requests a broad band in the order of Mbps.

4. The logical channel setting system as claimed in claim 2, wherein the ATM network, in response to receipt of the call setup message from the call means of the transmitting terminal adapter, transmits the call setup message to the receiving terminal adapter and a call procedure signal to the corresponding transmitting terminal equipment and, further, in response to receipt of a connect message from the receiving terminal equipment, transmitted thereto through the corresponding receiving terminal adapter, transmits a connect ON message to the transmitting terminal adapter and thereafter transmits a connect acknowledgement message to the receiving terminal adapter.

5. The logical channel setting system as claimed in claim 4, wherein:

the transmitting terminal adapter, upon receipt of the connect signal from the ATM network, transmits a connect ON signal to the corresponding transmitting terminal equipment;

the receiving terminal adapter, in response to the connect acknowledgement signal, enabling receipt of a data transmission by the corresponding receiving terminal equipment; and the transmitting terminal equipment, in response to the connect ON signal, initiating the transmission of data through the corresponding transmitting terminal adapter and the ATM network to the receiving terminal adapter and corresponding receiving terminal equipment.

6. The logical channel setting system as claimed in claim 5, wherein the transmitting terminal equipment transmits an OFF request signal when a data transmission being performed thereby ends, and said disconnect means transmits a disconnect message over the ATM network to the receiving terminal adapter and corresponding receiving terminal equipment in response to the OFF request signal.

7. The logical channel setting system as claimed in claim 2, wherein the transmitting terminal equipment transmits an OFF request signal when a data transmission being performed thereby ends, and said disconnect means transmits a disconnect message over the ATM network to the receiving terminal adapter and corresponding receiving terminal equipment in response to the OFF request signal.

8. A logical channel setting system for an asynchronous transfer mode (ATM) network coupled to corresponding terminal equipment via a respective terminal adapter, the system comprising:

call means operable when the terminal adapter is a transmitting terminal adapter, for setting a logical channel in the ATM network, said logical channel having a narrow band in the order of Kbps;

first message transmitting means, operable when the terminal adapter is a transmitting terminal adapter and responsive to an ON request signal from the corresponding terminal equipment, for transmitting to the ATM network a band change message which requests a change of the band width of the logical channel from the narrow band to a broad band in the order of Mbps; and second message transmitting means, operable when the terminal adapter is a transmitting terminal adapter and responsive to an OFF request signal received thereby from the corresponding transmitting terminal equipment, for transmitting to the ATM network a band release message which requests a change of the band width of the logical channel from the broad band to the narrow band.

9. The logical channel setting system as claimed in claim 8, wherein said call means sets the logical channel by transmitting a call setup message to the ATM network requesting the logical channel and the narrow band to the receiving terminal adapter and corresponding receiving terminal equipment via the ATM network.

10. The logical channel setting system as claimed in claim 9, wherein:

the ATM network, in response to receipt of the call setup message from the call means of the transmitting terminal adapter, transmits a call procedure message to the transmitting terminal adapter and, further, in response to a connect message from the receiving terminal adapter, transmits a connect message to the transmitting terminal adapter and a connect acknowledge message to the receiving terminal adapter and, further, in response to the band change message transmitted thereto by the first transmission means, transmits a band change message to the receiving terminal adapter;

the receiving terminal adapter transmitting an request ON message to the corresponding receiving terminal equipment and, in response thereto, the receiving terminal equipment transmitting a connect ON message to the receiving terminal adapter and, in response thereto, the receiving terminal adapter transmitting a band width confirmation message to the ATM network; and the ATM network transmitting the band width confirmation message to the transmitting terminal adapter and, in response thereto, the transmitting terminal adapter transmitting a connect ON message to the corresponding transmitting terminal equipment, the transmitting terminal equipment thereupon transmitting data to the corresponding transmitting terminal adapter for transfer over the ATM network to the receiving terminal adapter and corresponding receiving terminal equipment.

11. The logical channel setting system as claimed in claim 10, wherein the transmitting terminal equipment transmits an OFF request signal when a data transmission being performed thereby ends.

12. The logical channel setting system as claimed in claim 8, wherein the transmitting terminal equipment transmits an OFF request signal when a data transmission being performed thereby ends.

13. A logical channel setting system for a communication network carrying fixed bit length cells over a selected one of plural routes from a transmitting terminal to a receiving terminal and which cells contain, respectively and selectively, plural different types of information, the system comprising:

plural terminal adapters and plural, respectively associated terminal equipments, each thereof operable in conformance with a high-speed digital transmission interface for transmitting burst digital information and each terminal adaptor and respectively associated terminal equipment being selectively operable, in a transmit mode, as a transmitting terminal adaptor and a respectively associated transmitting terminal equipment and, in a receiving mode, as a receiving terminal adaptor and a respectively associated receiving terminal equipment, each terminal equipment being coupled by the respectively associated terminal adaptor to the communication network;

each transmitting terminal equipment being selectively operable for generating and supplying, to the respectively associated transmitting terminal adapter, a request signal which, when ON, requests the setting of an associated logical channel in the communication network and which, when OFF, requests the release of an associated logical channel which currently is set in the communication network; and each terminal adapter further comprises:

call means, operable in the transmitting mode of the terminal adapter and in response to the receipt of an ON request signal from the respectively associated transmitting terminal equipment, for setting the associated logical channel in the communication network between the transmitting terminal adapter and the receiving terminal adapter of a respectively associated receiving terminal equipment, thereby to enable the transfer of data from the transmitting terminal equipment and respectively associated transmitting terminal adapter through the communication network to the receiving terminal adapter and thereby to the respectively associated receiving terminal equipment, and disconnect means, operable in the transmitting mode of the terminal adapter and in response to receipt of an OFF request signal from the respectively associated transmitting terminal equipment, for releasing a logical channel which currently is set in the communication network.

14. The logical channel setting system as claimed in claim 13, wherein said call means sets the logical channel by transmitting a call setup message to the communication network requesting the logical channel and a band to the receiving terminal adapter and respectively associated receiving terminal equipment via the communication network.

15. The logical channel setting system as claimed in claim 14, wherein said call means requests a broad band in the order of Mbps.

16. The logical channel setting system as claimed in claim 14, wherein the communication network, in response to receipt of the call setup message from the call means of the transmitting terminal adapter, transmits the call setup message to the receiving terminal adapter and a call procedure signal to the respectively associated transmitting terminal equipment and, further, in response to receipt of a connect message from the receiving terminal equipment, transmitted thereto through the respectively associated receiving terminal adapter, transmits a connect ON message to the transmitting terminal adapter and thereafter transmits a connect acknowledgement message to the receiving terminal adapter.

17. The logical channel setting system as claimed in claim 14, wherein the transmitting terminal equipment transmits an OFF request signal when a data transmission being performed thereby ends, and said disconnect means transmits a disconnect message over the communication network to the receiving terminal adapter and respectively associated receiving terminal equipment in response to the OFF request signal.

18. A logical channel setting system for a communication network carrying fixed bit length cells over a selected one of plural routes from a transmitting terminal to a receiving terminal and which the cells contain, respectively and selectively, plural different types of information, the system comprising:

plural terminal adapters and plural, respectively associated terminal equipments operable in conformance with a high-speed digital transmission interface for transmitting burst digital information, each terminal equipment being coupled by the respectively associated terminal adaptor to the communication network and each terminal adaptor and respectively associated terminal equipment being selectively operable, in a transmit mode, as a transmitting terminal adaptor and a respectively associated transmitting terminal equipment and, in a receiving mode, as a receiving terminal adaptor and a respectively associated receiving terminal equipment;

each terminal adaptor further comprising:

call means, operable when the terminal adapter is a transmitting terminal adapter, for setting a logical channel having a narrow band in the order of Kbps in the communication network, first message transmitting means, operable when the terminal adapter is a transmitting terminal adapter and responsive to an ON request signal from the respectively associated transmitting terminal equipment, for transmitting to the communication network a band change message which requests a change of the band width of the logical channel from the narrow band to a broad band in the order of Mbps, and second message transmitting means, operable when the terminal adapter is a transmitting terminal adapter and responsive to an OFF request signal received thereby from the respectively associated transmitting terminal equipment, for transmitting to the communication network a band release message which requests a change of the band width of the logical channel from the broad band to the narrow band.

19. The logical channel setting system as claimed in claim 18, wherein the call means of each respectively associated terminal adaptor sets the logical channel by transmitting a call setup message to the communication network requesting the logical channel and the narrow band to the receiving terminal adapter and respectively associated receiving terminal equipment via the communication network.

20. The logical channel setting system as claimed in claim 19, wherein:

the communication network, in response to receipt of the call setup message from the call means of the transmitting terminal adapter, transmits a call procedure message to the transmitting terminal adapter and, further, in response to a connect message from the receiving terminal adapter, transmits a connect message to the transmitting terminal adapter and a connect acknowledge message to the receiving terminal adapter and, further, in response to the band change message transmitted thereto by the first transmission means, transmits a band change message to the receiving terminal adapter;

the receiving terminal adapter transmits a request ON message to the respectively associated receiving terminal equipment and, in response thereto, the receiving terminal equipment transmits a connect ON message to the receiving terminal adapter and, in response thereto, the receiving terminal adapter transmits a band width confirmation message to the communication network; and the communication network transmits the band width confirmation message to the transmitting terminal adapter and, in response thereto, the transmitting terminal adapter transmits a connect ON message to the respectively associated transmitting terminal equipment, the transmitting terminal equipment thereupon transmitting data to the respectively associated transmitting terminal adapter for transfer over the communication network to the receiving terminal adapter and respectively associated receiving terminal equipment.

21. The logical channel setting system as claimed in claim 18, wherein the transmitting terminal equipment transmits an OFF request signal when a data transmission being performed thereby ends.

22. The logical channel setting system as claimed in claim 16, wherein:

the transmitting terminal adapter, upon receipt of the connect signal from the communication network, transmits a connect ON signal to the respectively associated transmitting terminal equipment;

the receiving terminal adapter, in response to the connect acknowledgement signal, enables receipt of a data transmission by the respectively associated receiving terminal equipment; and the transmitting terminal equipment, in response to the connect ON signal, initiates the transmission of data through the respectively associated transmitting terminal adapter and the communication network to the receiving terminal adapter and respectively associated receiving terminal equipment.

23. The logical channel setting system as claimed in claim 22, wherein the transmitting terminal equipment transmits an OFF request signal when a data transmission being performed thereby ends, and said disconnect means transmits a disconnect message over the communication network to the receiving terminal adapter and respectively associated receiving terminal equipment in response to the OFF request signal.

24. The logical channel setting system as claimed in claim 20, wherein the transmitting terminal equipment transmits an OFF request signal when a data transmission being performed thereby ends.

25. A terminal adaptor for coupling a respectively associated terminal equipment to a communication network, the terminal adapter being operable selectively in a transmitting mode, as a transmitting terminal adapter, and in a receiving mode, as a receiving terminal adapter, the transmitting terminal adapter coupling data from a respectively associated transmitting terminal equipment to a communication network for transmission thereover and the receiving terminal adapter receiving data transmitted over a communication network and coupling the received data to a respectively associated receiving terminal equipment, the communication network carrying data in fixed bit length cells over a selected one of plural routes, the terminal adapter comprising:

call means, operable in the transmitting mode of the terminal adapter and in response to the receipt of an ON request signal from a respectively associated transmitting terminal equipment, for setting an associated logical channel in the communication network thereby to enable the coupling of data from the respectively associated transmitting terminal equipment to the communication network for transmission thereover; and disconnect means, operable in the transmitting mode of the terminal adapter and in response to receipt of an OFF request signal from the respectively associated transmitting terminal equipment, for releasing a logical channel which currently is set in the communication network.

26. The terminal adapter as claimed in claim 25, wherein said call means sets the logical channel by transmitting a call setup message to the communication network requesting the logical channel and a band to a remote, receiving terminal adapter and a respectively associated and remote receiving terminal equipment via the communication network.

27. The terminal adapter as claimed in claim 26, wherein said call means requests a broad band in the order of Mbps.

28. The terminal adapter as claimed in claim 26, wherein the communication network, in response to receipt of the call setup message from the call means of the transmitting terminal adapter, transmits the call setup message to the remote receiving terminal adapter and a call procedure signal to the respectively associated transmitting terminal equipment and, further, in response to receipt of a connect message from the remote, receiving terminal equipment, transmitted thereto through the respectively associated and remote receiving terminal adapter, transmits a connect ON message to the transmitting terminal adapter and thereafter transmits a connect acknowledgement message to the remote, receiving terminal adapter.

29. The terminal adapter as claimed in claim 26, wherein the transmitting terminal equipment transmits an OFF request signal when a data transmission being performed thereby ends, and said disconnect means transmits a disconnect message over the communication network to the remote, receiving terminal adapter and respectively associated, remote receiving terminal equipment in response to the OFF request signal.

30. A terminal adaptor for coupling a respectively associated terminal equipment to a communication network, the terminal adapter and respectively associated terminal equipment being operable, selectively, in a transmitting mode and in a receiving mode respectively for transmitting data over the communication network to a remote receiving terminal adapter and a respectively associated, remote terminal equipment and for receiving data, transmitted over the communications network from a remote, transmitting terminal adapter and a respectively associated and remote terminal equipment, the communication network carrying fixed bit length cells over a selected one of plural routes selectively interconnecting a transmitting terminal adapter and a receiving terminal adapter designated by the transmitting terminal adapter, each terminal adaptor comprising:

call means, operable when the terminal adapter is a transmitting terminal adapter, for setting a logical channel having a narrow band in the order of Kbps in the communication network;

first message transmitting means, operable when the terminal adapter is a transmitting terminal adapter and responsive to an ON request signal from the respectively associated terminal equipment, for transmitting to the communication network a band change message which requests a change of the band width of the logical channel from the narrow band to a broad band in the order of Mbps; and second message transmitting means, operable when the terminal adapter is a transmitting terminal adapter and responsive to an OFF request signal received thereby from the respectively associated transmitting terminal equipment, for transmitting to the communication network a band release message which requests a change of the band width of the logical channel from the broad band to the narrow band.

31. The terminal adapter as claimed in claim 30, wherein the call means sets the logical channel by transmitting a call setup message to the communication network requesting the logical channel and the narrow band to a remote receiving terminal adapter and respectively associated, remote receiving terminal equipment via the communication network.

32. The terminal adapter as claimed in claim 31, wherein:

the communication network, in response to receipt of the call setup message from the call means of the transmitting terminal adapter, transmits a call procedure message to the transmitting terminal adapter and, further, in response to a connect message from the remote, receiving terminal adapter, transmits a connect message to the transmitting terminal adapter and a connect acknowledge message to the remote, receiving terminal adapter and, further, in response to the band change message transmitted thereto by the first transmission means, transmits a band change message to the remote, receiving terminal adapter;

the remote, receiving terminal adapter transmits a request ON message to the respectively associated and remote receiving terminal equipment and, in response thereto, the remote receiving terminal equipment transmits a connect ON message to the remote receiving terminal adapter and, in response thereto, the remote receiving terminal adapter transmits a band width confirmation message to the communication network; and the communication network transmits the band width confirmation message to the transmitting terminal adapter and, in response thereto, the transmitting terminal adapter transmits a connect ON message to the respectively associated transmitting terminal equipment, the transmitting terminal equipment thereupon transmitting data to the respectively associated transmitting terminal adapter for transfer over the communication network to the remote receiving terminal adapter for coupling thereby to the respectively associated and remote receiving terminal equipment.

33. The terminal adapter as claimed in claim 30, wherein the transmitting terminal equipment transmits an OFF request signal when a data transmission being performed thereby ends.

34. The terminal adapter as claimed in claim 28, wherein:

the transmitting terminal adapter, upon receipt of the connect signal from the communication network, transmits a connect ON signal to the respectively associated transmitting terminal equipment;

the remote receiving terminal adapter, in response to the connect acknowledgement signal, enables receipt of a data transmission by the respectively associated and remote receiving terminal equipment; and the transmitting terminal equipment, in response to the connect ON signal, initiates the transmission of data through the respectively associated transmitting terminal adapter and the communication network to the remote receiving terminal adapter and the respectively associated and remote receiving terminal equipment.

35. The terminal adapter as claimed in claim 34, wherein the transmitting terminal equipment transmits an OFF request signal when a data transmission being performed thereby ends, and said disconnect means transmits a disconnect message over the communication network to the remote, receiving terminal adapter and the respectively associated and remote receiving terminal equipment in response to the OFF request signal.

36. The terminal adapter as claimed in claim 32, wherein the transmitting terminal equipment transmits an OFF request signal when a data transmission being performed thereby ends.

* * * * *

UNITED STATES PATENT AND TRADEMARK OFFICE
CERTIFICATE OF CORRECTION

PATENT NO. : 5,479,402
DATED : Dec. 26, 1995
INVENTOR(S) : HATA et al.

It is certified that error appears in the above-indentified patent and that said Letters Patent is hereby corrected as shown below:

Col. 1, line 43, change "kbytes" to --Kbytes--.

Col. 3, line 25, after "network" delete ",".

Col. 9, line 13 (claim 1, line 2), after "network" insert --,--.

Signed and Sealed this

Eleventh Day of June, 1996

Attest:

BRUCE LEHMAN

*Attesting Officer*   *Commissioner of Patents and Trademarks*